Oct. 20, 1936. J. B. McGAUGHY 2,057,664
GAS ORIFICE METER CHART CALCULATING MACHINE
Original Filed Sept. 4, 1929 8 Sheets-Sheet 3

WITNESSES
C. B. Shillinger
J. T. Schrott

INVENTOR
John B. McGaughy
BY
Munn Co.
ATTORNEY

Oct. 20, 1936.     J. B. McGAUGHY     2,057,664
GAS ORIFICE METER CHART CALCULATING MACHINE
Original Filed Sept. 4, 1929    8 Sheets-Sheet 4
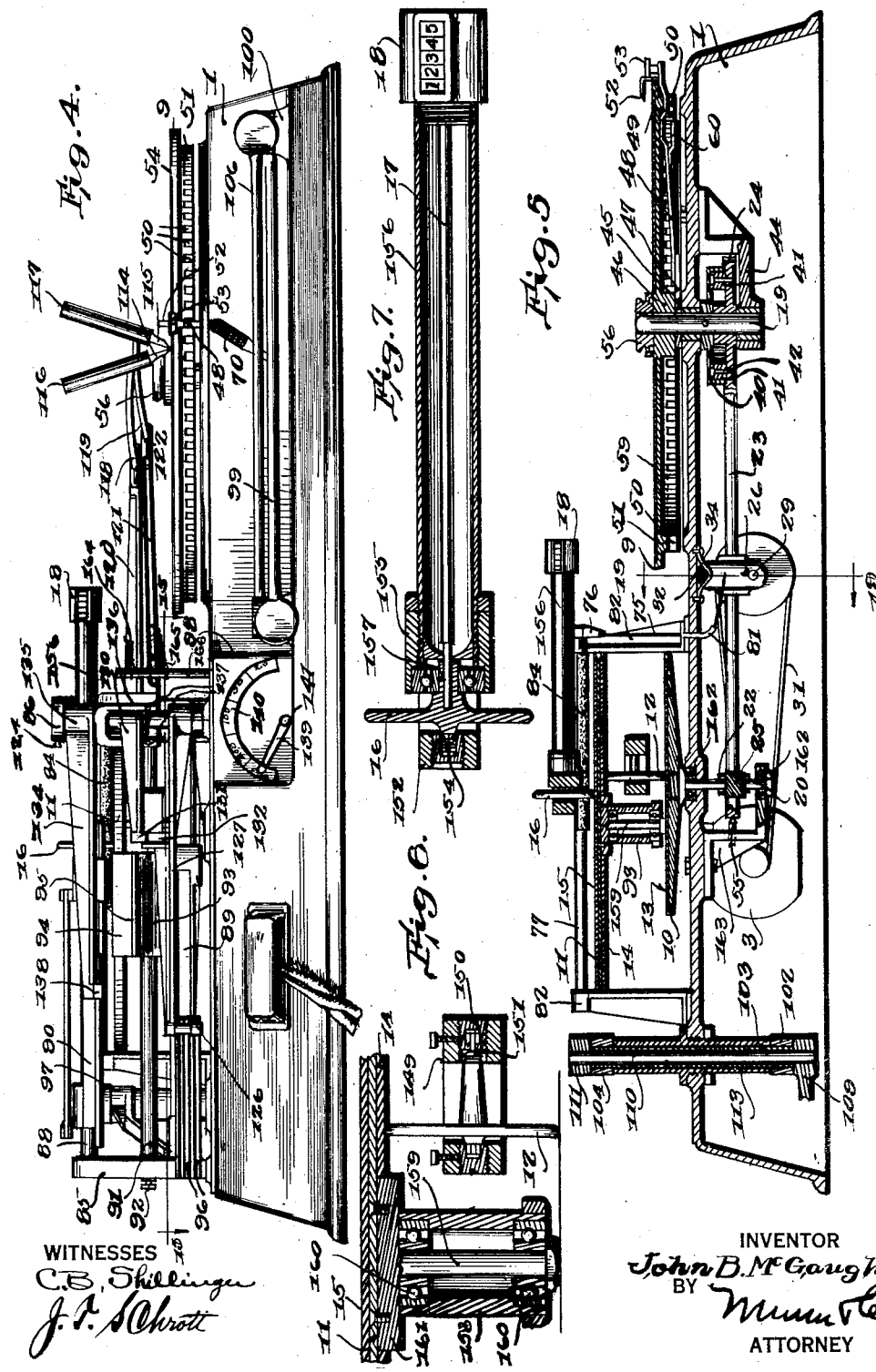
INVENTOR
John B. McGaughy
BY
ATTORNEY

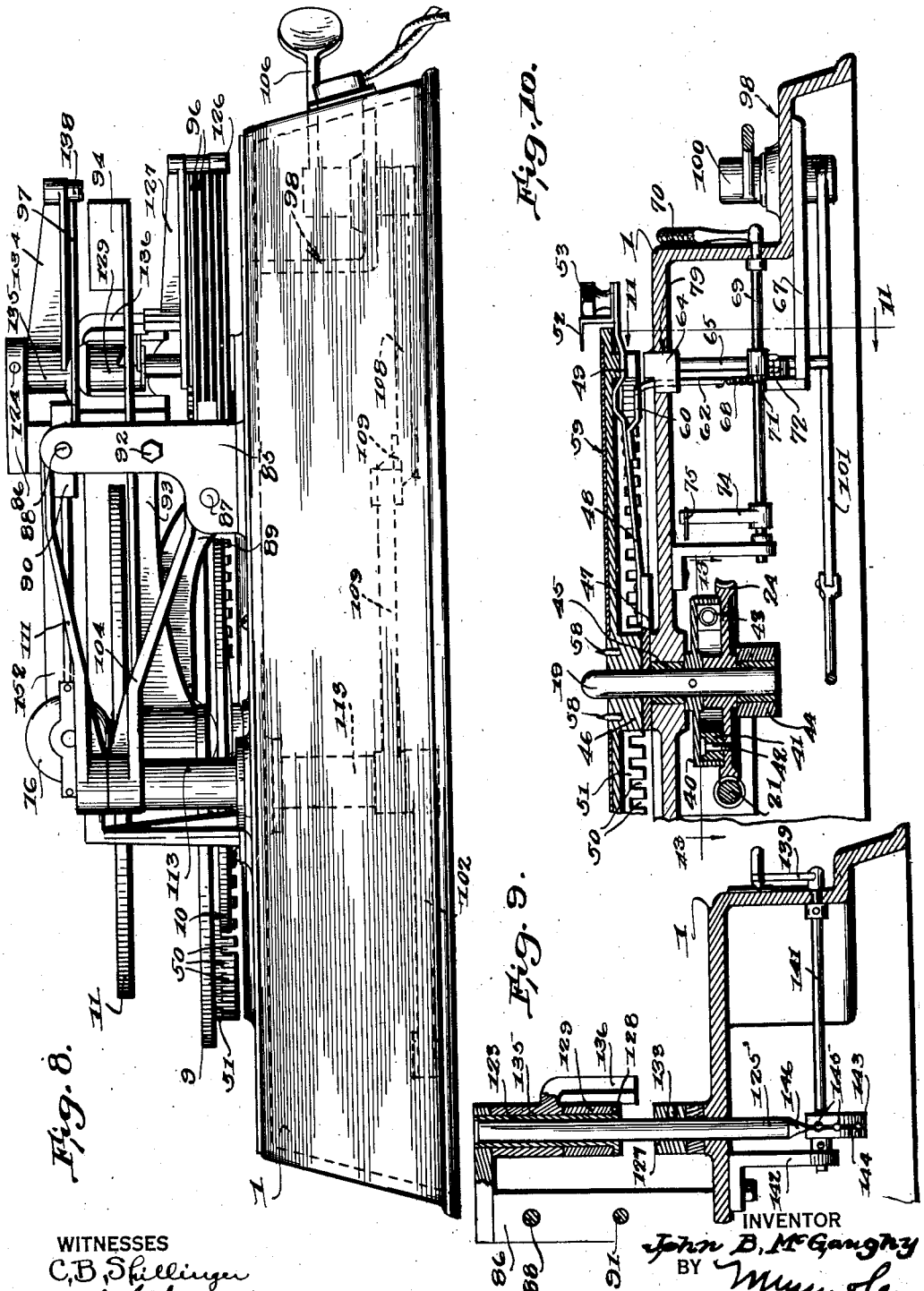

Oct. 20, 1936. J. B. McGAUGHY 2,057,664
GAS ORIFICE METER CHART CALCULATING MACHINE
Original Filed Sept. 4, 1929 8 Sheets-Sheet 6
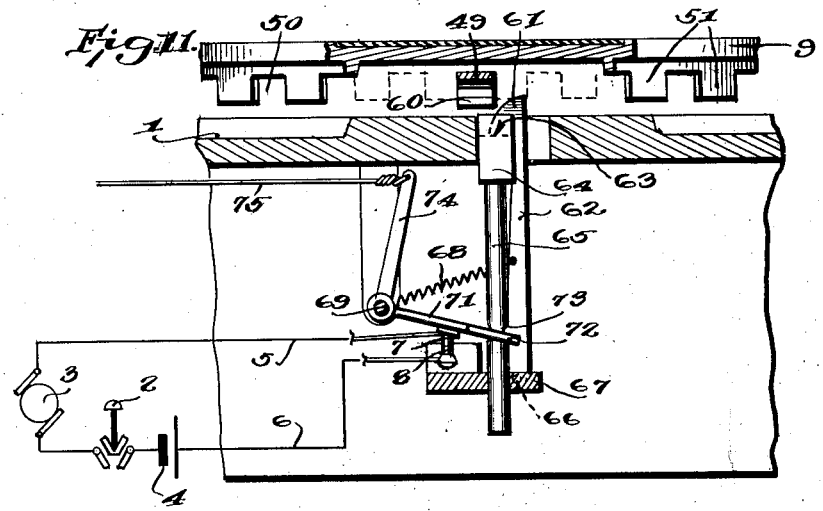
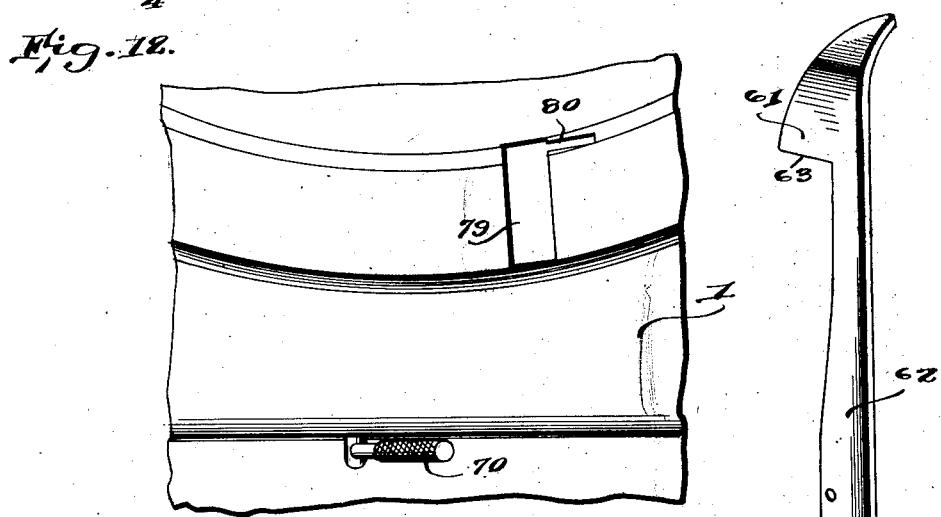
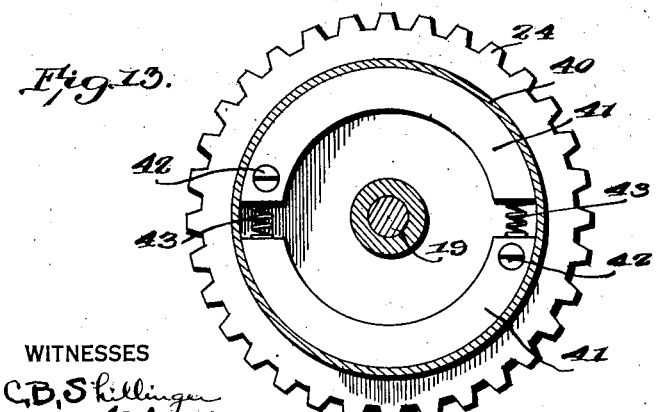
INVENTOR
John B. McGaughy
BY
ATTORNEY
WITNESSES Oct. 20, 1936.   J. B. McGAUGHY   2,057,664
GAS ORIFICE METER CHART CALCULATING MACHINE
Original Filed Sept. 4, 1929   8 Sheets-Sheet 7
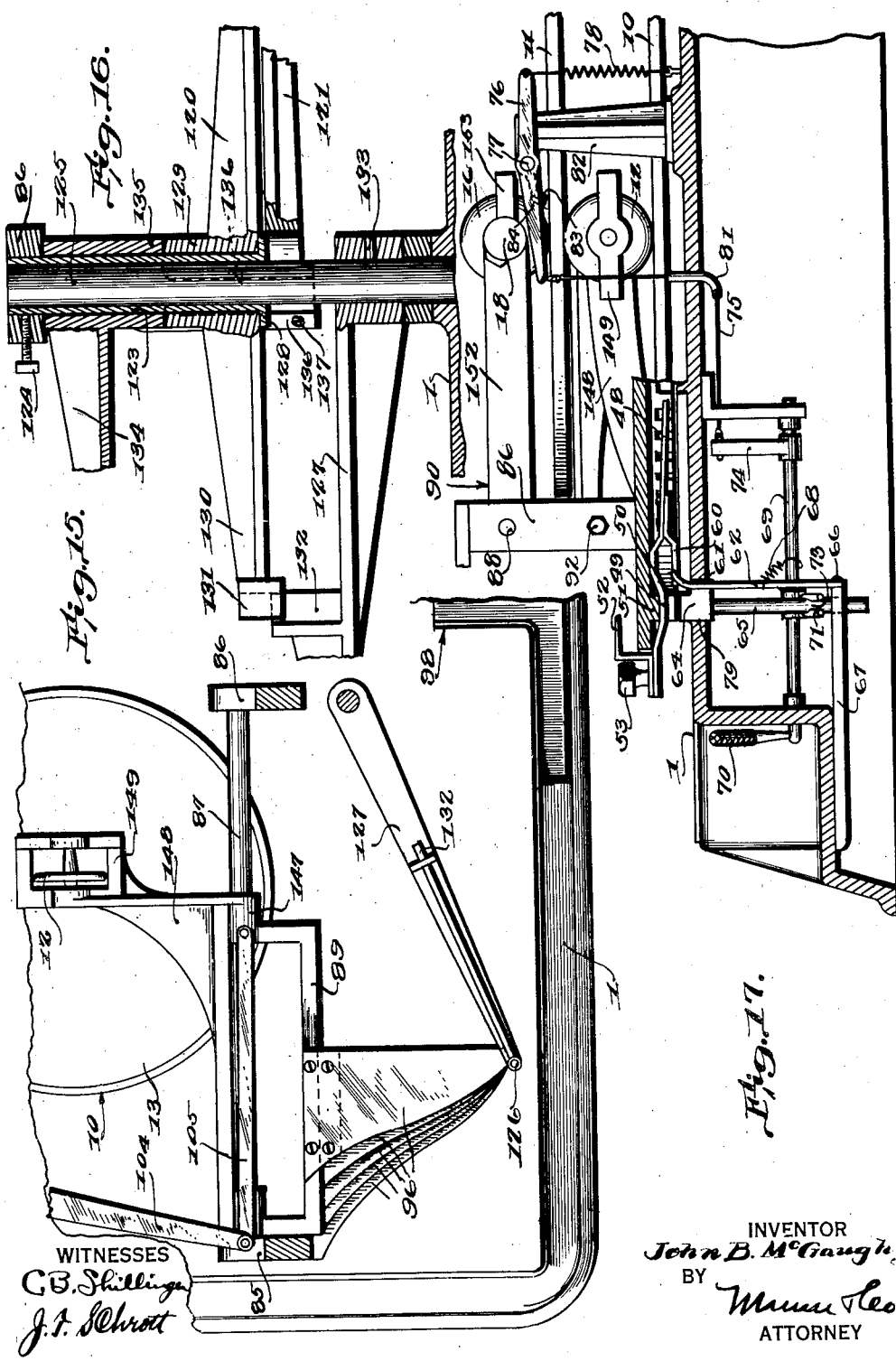
INVENTOR
John B. McGaughy
BY
ATTORNEY
WITNESSES Oct. 20, 1936.  J. B. McGAUGHY  2,057,664
GAS ORIFICE METER CHART CALCULATING MACHINE
Original Filed Sept. 4, 1929    8 Sheets—Sheet 8
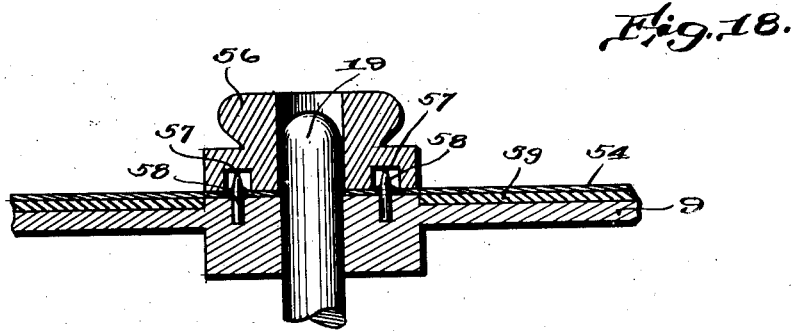
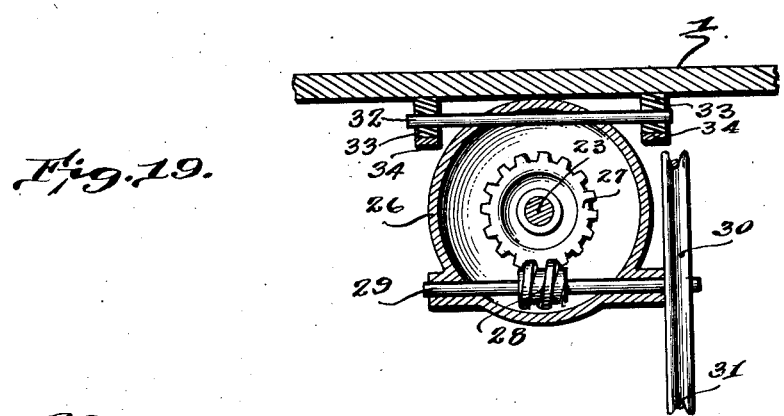
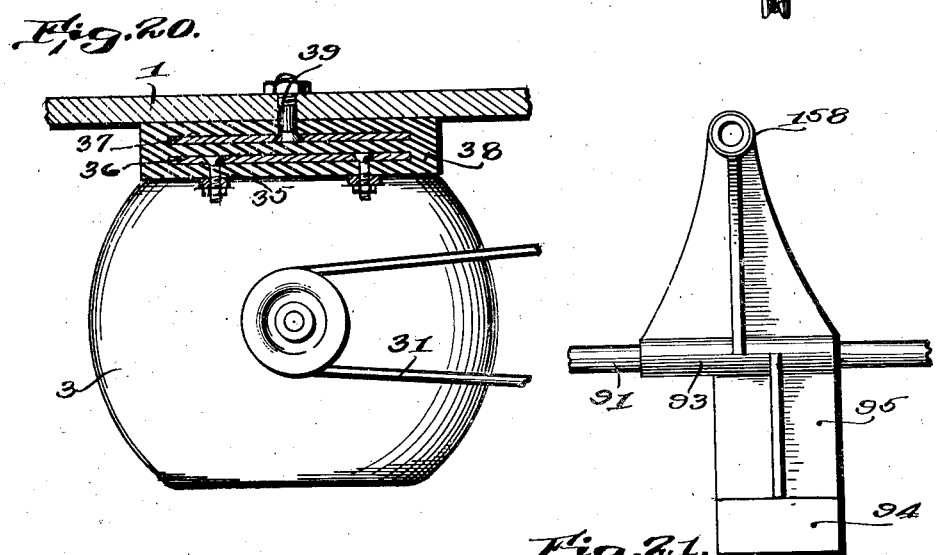
WITNESSES
INVENTOR
John B. McGaughy
BY
ATTORNEY Patented Oct. 20, 1936

2,057,664

UNITED STATES PATENT OFFICE 2,057,664

GAS ORIFICE METER CHART CALCULATING MACHINE

John B. McGaughy, Tulsa, Okla., assignor to Pittsburgh Equitable Meter Company, Pittsburgh, Pa., a corporation of Pennsylvania Application September 4, 1929, Serial No. 390,347
Renewed October 24, 1934

47 Claims. (Cl. 235—61)

This invention relates to improvements in computing or calculating machines, and it consists of the constructions, combinations and arrangements herein described and claimed.

An object of the invention is to provide a machine of the character described which embodies several outstanding improvements over a similar machine disclosed in an application filed by John B. McGaughy, May 23, 1928, Serial No. 279,942, one of which improvements is to utilize the offset in the centers of the prime mover and pressure disks to provide a speed change ratio in the pressure disc by virtue of now making an associated pressure wheel movable in respect to each disk with each of which it contacts.

Another object of the invention which embraces a second improvement is to widen the range of the machine by incorporating multiple cams which may be shifted from one pressure range chart to another by making a simple adjustment in the mechanism.

A further object of the invention which embraces a third improvement is to better the stopping mechanism and to incorporate therein a slipping clutch which will protect the mechanism from damage when the chart plate is brought to a sudden stop.

A still further and fundamental object of the invention is to enable the instantaneous computation of the so-called "extension" of a meter chart by utilizing the pressure and differential curves inscribed thereon as the basis of an equation to which the application of a co-efficient will give a product in thousands of cubic feet.

Other objects and advantages will appear in the following specification, reference being had to the accompanying drawings, in which:

Figure 4 is a front elevation,

Figure 5 is a longitudinal section taken on the line 5—5 of Figure 2,

Figure 2:
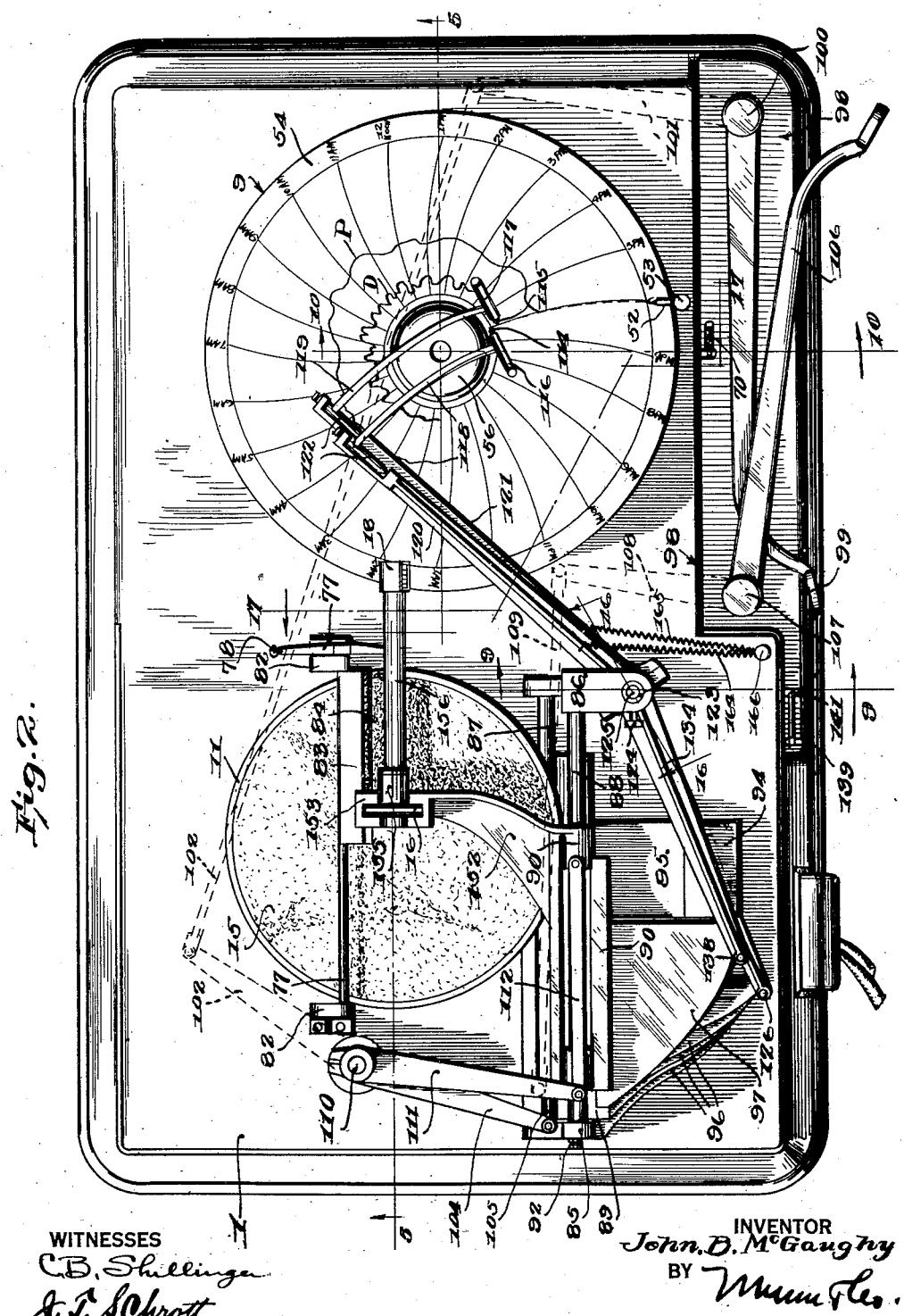
Figure 2 is a plan view thereof, the cover being omitted.

Figure 6 is a detail sectional view particularly illustrating the bearings of the pressure disk and of the associated pressure wheel, Figure 7 is a detail section of the extension tube and its carried parts, Figure 8 is an elevation of the left end of the machine, Figure 9 is a cross section taken on the line 9—9 of Figure 2, Figure 10 is a cross section taken substantially on the line 10—10 of Figure 2, Figure 11 is a detail section taken on the line 11—11 of Figure 10, the electrical circuit being diagrammatically illustrated, Figure 12 is a detail plan view of a portion of the base, particularly illustrating the plunger and trigger slots, Figure 13 is a detail section taken on the line 13—13 of Figure 10, Figure 14 is a detail perspective view of the trigger hereinafter described, Figure 15 is a horizontal section taken substantially on the line 15—15 of Figure 4, particularly illustrating the so-called pressure carriage and its multiple cams, Figure 16 is a detail section taken on the line 16—16 of Figure 2, Figure 17 is a section taken substantially on the line 17—17 of Figure 2, particularly illustrating the brake and rocker and the connections thereof with the control shaft and handle, Figure 18 is a detail sectional view illustrating how the weight and pins keep the chart in place on the chart plate, Figure 19 is a section taken on the line 19—19 of Figure 5, Figure 20 is a detail sectional view of the motor mounting, Figure 21 is a plan view of the plate support for the pressure disk 11, also showing the rod by which it is carried.

As is fully developed in the co-pending patent application identified above, it is a purpose of the machine to integrate the data on orifice meter charts as they are received from the field so that the quantity of fluid that has passed through an orifice during any determined time can be instantly ascertained. It is a function of the machine to enable an instant computation, thus both eliminating the laborious calculations ordinarily involved, as well as the clerical aid necessary to carrying them out.

It will presently appear that all the operator has to do is to fix the chart upon the chart plate, set the pointer to the starting place, start the motor and manipulate the pressure and differential hand levers so that the styli follow the corresponding curves on the chart by which process a numerical value will appear in the counter to be used as a factor in a simple equation which will give a product in thousands of cubic feet. Thus, it is possible to integrate or decipher a large number of charts in a relatively short space of time and the operations can be performed by one operator.

Reference is made to the drawings. A hollow base 1 carries all of the mechanism excepting a foot controller 2 (Fig. 11) which usually occupies a place on the floor. This controller is the secondary closer of an electrical circuit in which a motor 3 is situated, the former including a source of current 4 as well as wires 5 and 6 which terminate at movable and fixed contacts 7 and 8.

Situated upon the base is a circular chart plate 9, a prime mover or time disk 10 and a pressure disk 11. A pressure wheel 12 occupies a position between and in contact with the two disks so that the rotary motion of the disk 10 will be imparted to the disk 11. In order that no slippage may occur, the working face of the disk 10 has a rubber inset 13 vulcanized thereto, and the respective sides of the disk 11 are equipped with rubber faces 14 and 15.

A so-called differential wheel 16 rides upon the rubber face 15 of the disk 11 and as the latter rotates, turning motion is imparted to the wheel 16 and shaft 17 (Fig. 7) which actuates the counter 18. Driving of the chart plate and time shafts 19 and 20 by which the chart plate 9 and time disk 10 are carried is the simultaneous accomplishment and sole purpose of the motor 3.

Worms 21 and 22 near the ends of a drive shaft 23 (Figs. 3 and 5) mesh with and drive gears 24 and 25 on the shafts 19 and 20. The drive shaft has bearing on end pins 55 and passes through a gear box 26 (Figs. 5 and 19) where it carries a gear 27 that meshes with a worm 28 on a counter shaft 29 which has suitable bearing upon the gear box. A pulley 30 on one end of the counter shaft receives the drive belt 31 of the motor 3 so that as the latter operates, power is delivered to the drive shaft 23 and equally divided between the plate 9 and disk 10.

Figure 3:
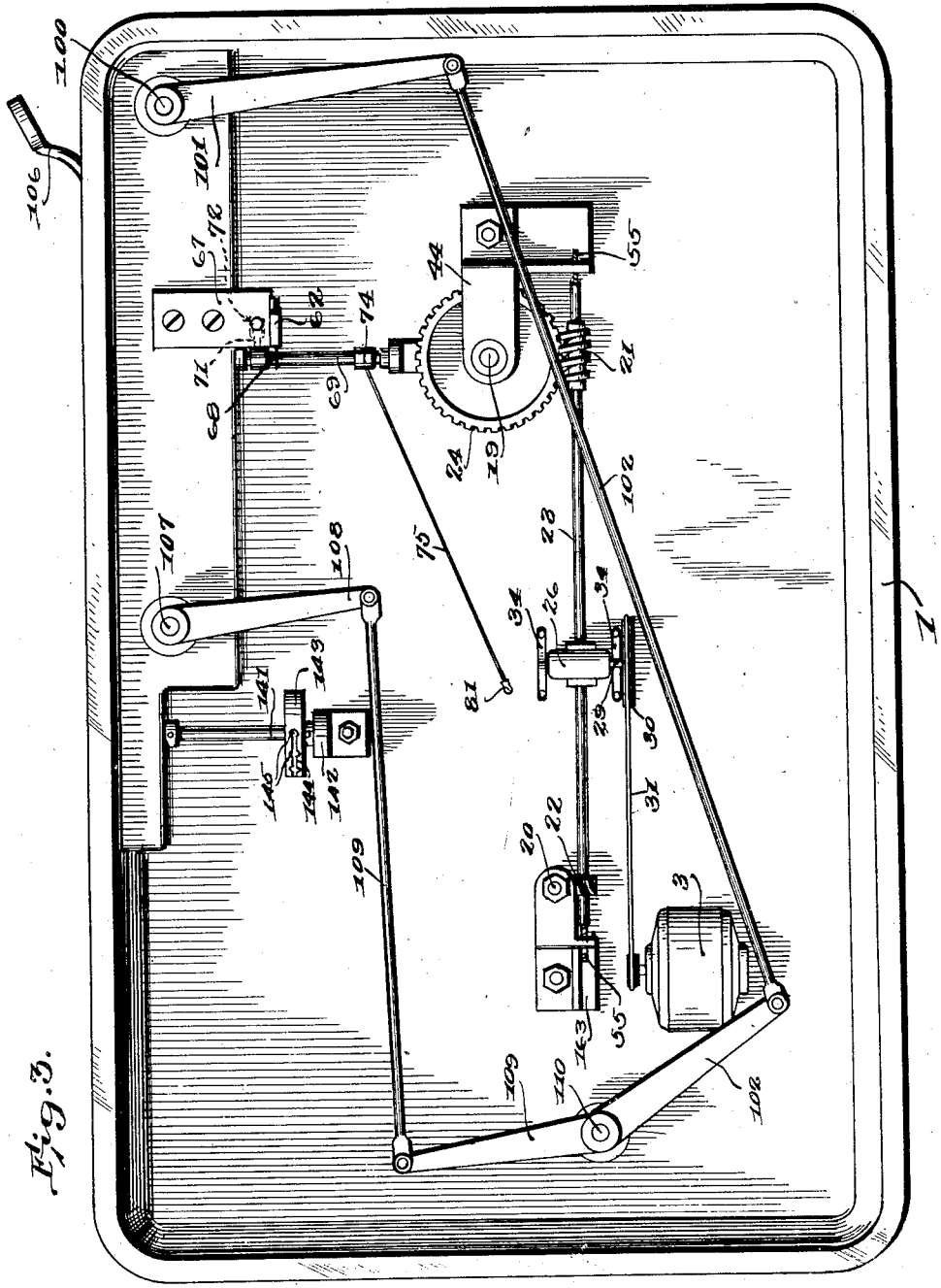
Figure 3 is an inverted plan view of the machine.

Silencing of the foregoing drive mechanism is accomplished by suspending the gear box 26 from a rod 32 (Fig. 19), the ends of which have rubber settings 33 in brackets 34 secured to the underside of the base as shown in Figure 3. The projection of the rod through the gear box prevents the latter from revolving in respect to the drive shaft 23. The motor 3 is secured at 35 (Fig. 20) to one of a pair of plates 36, 37, which are imbedded in and vulcanized to a rubber block 38.

A suitable fastening device 39 secures the plate 37, hence its suspended assembly, to the underside of the base, and inasmuch as rubber is interposed in the connections of both the gear box 23 and motor 3 to the base 1, it follows that the vibrations will be completely damped out and there will be no perceptible noise in the operation of the machine. This is a desirable factor both from the standpoint of the operator and the endurance of the mechanism. While the construction of the latter is rugged, yet it is a desirable quality to obviate any tremor that might possibly have a bad effect.

A slip clutch is interposed between the gear 24 and the chart shaft 19. The latter fixedly carries a cup 40 which receives a pair of arcuate shoes 41 (Fig. 13). These are square in cross section. Each is pivoted upon a screw 42 which is driven into the web of the gear 24. Springs 43, abutting the pivoted and confronting free ends of the shoes press upon the latter and keep the shoes expanded against the inner wall of the cup 40. The friction between the shoes and the cup is ample to maintain the necessary driving effort between the shaft 23 and plate 9, but when the latter is suddenly stopped, the clutch will yield or slip.

A bracket 44 between which and the underside of the base 1 the slip clutch is situated, furnishes one bearing for the chart shaft 19. The other is furnished by a bushing 45. The hub 46 of the chart plate 9 rides upon the head 47 of the time control handle 48. This handle is composed of spring material and tends to bend upwardly toward the bottom of the chart plate 9. A depression 49 in the handle is engageable with any one of the slots 50 in the slotted rim 51 of the plate 9.

The rim is divided into ninety-six slots or teeth, representing quarter-hour intervals of a twenty-four hour chart. The engagement of the depression 49 with a given slot is intended to maintain a given setting of the handle 48. The latter carries a pointer 52 which extends over the edge of the plate 9. A button 53 facilitates the pressing down of the lever and the seating thereof in one of the slots, the pointer 52 being used to indicate that place on the chart 54 (Fig. 2) up to which a given calculation is to extend.

A weight 56 is designed to hold the chart 54 down. It has an annular groove 57 (Fig. 18) which is deep enough to receive the points of a number of pins 58 fixed in the chart plate 9 and pointing upwardly. The chart is fitted over the shaft 19, and when the weight 56 is put in place the pins are pushed through the chart and the latter is thus held from relative turning. A rubber inset 59 on the chart plate keeps the chart from slipping. As shown in Figure 18 the weight 56 has a central hole that receives the shaft 19, the latter protruding far enough above the chart plate for the purpose.

A trip 60 (Figs. 5, 10, and 17) carried by the handle 48 is engageable with the head 61 of a trigger 62 to release the shoulder 63 from the detent 64 of a slidable plunger 65 and thus stop the machine. For these purposes the trigger 62 is pivoted at 66 to a bracket 67 which is either secured to or forms a part of the base 1 (Figs. 10 and 17). A spring 68, secured at its ends to the trigger 62 and to the control shaft 69, keeps the head 61 over against the detent 64 so that the head will always be in position to hold the detent down when the machine is in operation.

Figure 1:
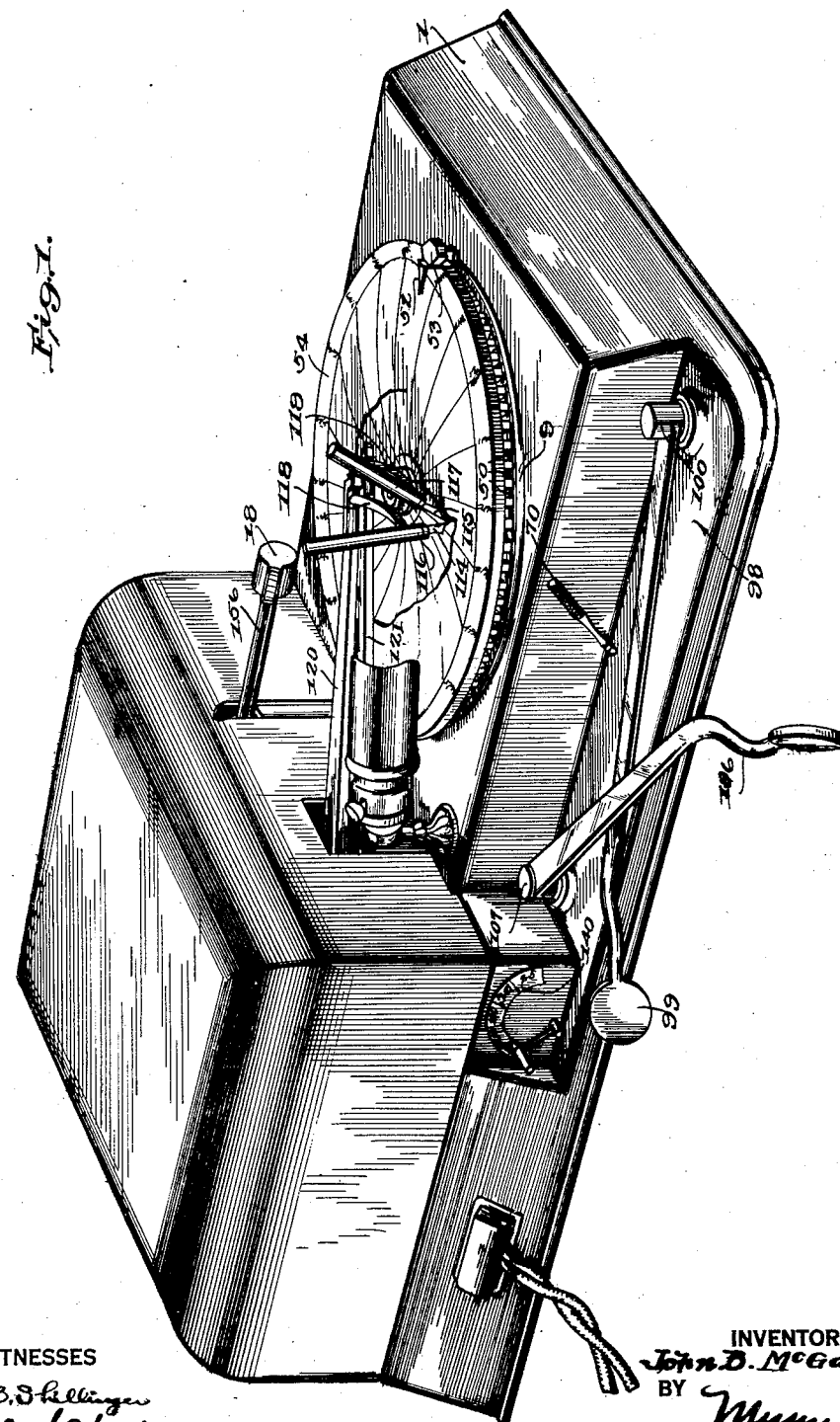
Figure 1 is a perspective view of the improved machine.

This is brought about by turning the control handle 70, and consequently the shaft 69 by which it is carried, to the right in Figures 1, 2, and 4. The control shaft carries what in effect is a bell-crank. The primary arm 71 of the latter has a forked end 72 which receives a constriction 73 in the plunger 65 (Figs. 11 and 17). It also carries the previously mentioned contact 7 which by virtue of this association, is rendered movable. The secondary arm 74 is situated at a place farther along the shaft. This arm has a flexible connection 75 with one end of a rocker 76. The rocker is fixed on one end of a brake shaft 77.

A spring 78, attached at its ends to the other extremity of the rocker 76 and to some part of the base 1, tends to continuously exert a pull on the flexible connection 75 which, being transmitted to the control shaft 69, tends to keep the plunger 65 in an elevated position. It is thus a function of the springs 68 and 78 to keep the head 61 and detent 64 in contact. There will be no lost motion at these parts. Connected slots 79 and 80 (Fig. 12) in the base 1 accommodate the detent 64 and trigger 62. One stands substantially at a right angle to the other and the slot 80 is deep enough to permit enough motion of the trigger to free the detent.

A tube 81 or a suitable equivalent guides the flexible element 75 through the base 1 and to its point of connection with the rocker 76. Standards 82 support the brake shaft 77 by which the rocker is carried. The standards are situated at opposite sides of the pressure disk 11 (Figs. 2 and 5) hence the shaft 77 extends across the disk as shown. It carries a shoe 83 with a cork or other pad 84 in position to engage the differential wheel 16, lift it from contact with the disk 11, and instantly stop both it and the counter 18 simultaneously with the stopping of the chart plate 9 when the trip 60 displaces the trigger 62.

Thus far it will be understood that the depressed position of the plunger 65 agrees with the running position of the machine. This is brought about by turning the handle 70 to the right as previously stated. The trigger 62 holds the plunger 65 down and also holds the brake shoe 83 and its pad 84 away from the differential wheel 16. The head 61 of the trigger lies in the path of the trip 60, and when the chart plate 9 has rotated sufficiently far to bring the trip 60 against the head, the latter will be displaced so that the spring 78 will at once stop the plate 9 and wheel 16 by rocking the brake shoe and elevating the detent 64 into one of the slots 50.

Brackets 85 and 86 fixedly support rods 87 and 88 upon which the pressure carriage 89 and the differential carriage 90 respectively slide. A rod 91 situated intermediately of the rods 87 and 88 and pivoted at its ends upon screws 92 has an attached support 93 by which the pressure disk 11 is carried. The carriages 89 and 90 are slidable upon the rods 87 and 88 in order that the wheels 12 and 16 may be made to traverse one radial side of the respective disks 10 and 11.

The plate support 93, however, is not subject to sliding movement. The weight of the disk 11 and its support 93 is partially counter-balanced by a weight 94 applied to an extension 95 of the support at that side of the rod 91 opposite to that on which the disk 11 is situated. The balanced mounting of the pressure disk permits its ready adaptation to the wheels 12 and 16, and eliminates undue pressure of the disk 11 on the wheel 12 which would cause difficulty in sliding the wheel 12 between the rubber surfaces 13 and 14. A plurality of cams 96 is affixed to the pressure carriage 89. These are designed in agreement with the various pressure ranges likely to be encountered in various charts. Only one of the cams will be brought into play at a time and when a proper adjustment has been made the selected cam will perform its function in the manner to be explained.

A differential cam 97 is affixed to the carriage 90. This, as in the instance of the group of cams 96, moves with its carriage when the latter is slid upon the rod 88. The manner in which the pressure and differential carriages are slid is as follows: Situated in a depression 98 at the front of the base 1 (Figs. 1, 2, and 4), is a pair of hand levers. The pressure hand lever 99 is pivoted at 100 and has an arm 101 with link connections 102 to a sleeve 103 (Fig. 5) to the upper end of which is attached an arm 104. This arm has a link connection 105 with the pressure carriage 89 as clearly shown in Figure 15.

The differential hand lever 106 is pivoted at 107 and has an arm 108 with link connections 109 to a stub shaft 110 at the upper extremity of which is connected an arm 111 which in turn has a link connection 112 with the differential carriage 90. The sleeve 103 has bearing in a bushing 113 (Figs. 5 and 8) that is suitably affixed to the base 1. It extends to approximately even distances above and below the floor of the base and while it furnishes a bearing for the sleeve, the latter in turn furnishes a bearing for the stub shaft 110.

While the previously discussed link connections 102 and 109 include arms respectively connected with the sleeve 103 and shaft 110, these arms are the same in nature as the arms 104 and 111. Thus there is the arrangement of a shaft and a concentric sleeve each with arms at the upper and lower extremities. The upper arms are connected with the pressure and differential carriages 89 and 90 while the lower arms form part of link connections which terminate in the pressure and differential hand levers 99 and 106. Thus by manipulating the hand levers the operator will be enabled to slide the carriages upon the rods 87 and 88 and cause the wheels 12 and 16 to move laterally of the disks 10 and 11.

But the movements of the carriages 89 and 90 have a very definite guide in the pressure and differential curves P and D on the chart 54. These so-called curves are inscribed upon the chart during the functioning of the orifice meter recording mechanism. The purpose of the machine is to produce a numerical reading in the counter 18 after the curves P and D have been traced for a pre-determined time period of the chart 54. The tracing is done by styli 114 and 115 which in this instance are fountain pens. These comprise ordinary nibs and sacks fitted in steel barrels 116, 117 secured to slender extensions 118, 119 of pressure and differential arms 120 and 121.

The free extremities of the arms are forked to pivotally receive the stems 122 of the extensions. The extensions are easily swung from the arms and the nibs bear upon the chart 54 only by the weight of the parts that carry them. An additional purpose of the rubber inset of the plate 9 is to avoid any danger to the nibs should either barrel 116 or 117 be dropped accidentally. By using fountain pens as the tracing points, the operator can see how well he is following the curves P and D as the object would be to make the superimposed curve as nearly co-incident with the previously inscribed curve as possible.

A sleeve 123 (Figs. 9 and 16), secured at 124 to the bracket 86 previously described, provides a bushing for a shaft 125 which is slidable to bring various ones of the group of cams 96 within range of the pressure roller 126 on the secondary member 127 of the pressure arm 120.

The arm 120 is free to turn upon the sleeve 123, the latter having a bottom flange 128 to support the hub 129 of the arm. An extension 130 of the pressure arm ends in a fork 131 which engages a stop 132 on the member 127.

Engagement of the fork 131 and stop 132 must always be maintained in order that the motions of the pressure arm 120 may be transmitted to the member 127. But the engagement must be of a movable nature in order that the raising or lowering of the secondary member may be compensated for. The member 127 is secured at 133 to the shaft 125 and as the latter is slid in its sleeve 123 the member 127 naturally goes with it.

On a similar principle the movements of the differential arm 121 are transmitted to its secondary member 134, but in this instance the connection between the arm and its member is fixed. The hub 135 of the member 134 is revoluble upon the sleeve 123. It has bearing on the hub 129 of the arm 120 (Fig. 16). It includes a pendant fork 136 through the lower extremities of which screws 137 are driven into the abutting end of the differential arm 121. The fork has sufficient spread to avoid the hub 129 and insure the latter an unimpeded turning movement.

A roller 138 carried by the secondary member 134 bears against the differential cam 97. Inasmuch as this is but a single cam no vertical adjustment of either the member 134 or the differential arm 121 is needed. The members 127 and 134 are actually parts of the pressure and differential arms 120, 121 and for the purpose of identification and also distinction may be known as the pressure and differential roller arms. Springs 164 and 165 anchored to a post 166 (Figs. 2 and 4) and connected with the arms 120 and 121 keep the rollers 138 and 126 in contact with the respective cams.

Vertical adjustments of the shaft 125 are made by means of an indicator handle 139. This handle traverses a scale 140 (Figs. 1 and 4) which has divisions equal in number to that of the cams in the group 96 and supplied with indicia concerning the various pressure ranges with which the machine will be concerned. For instance, the indicia reading from left to right will be 500# 250# 100# 50# and 25# Vac.

A shaft 141, journaled between an upright wall of the base and a pendant bracket 142, carries the handle 139 in the exposed position, and an eccentric 143 at a place immediately below the shaft 125. The eccentric has a peripheral groove 144 which is periodically interrupted with depressions 145 into which the point 146 of the shaft 125 will settle and thus preserve a given adjustment. Upon turning the handle 139 the eccentric 143 will ride under the shaft 125 and raise the latter by virtue of its eccentric, the engagement of the point with a given depression retaining both the shaft 125 and the handle 139 at its indication.

Reverting to the description of the carriages 89 and 90 as well as the plate support 93, it is observed in Fig. 15 that the pressure carriage 89 includes a pair of bosses 147 which receive and slide upon the rod 87. An extension 148 from the inner side of the carriage terminates in a fork 149 which is equipped with bearings 150 (Fig. 6) for the pintles 151 of the pressure wheel 12. The differential carriage 90 also has an extension 152 (Fig. 2) which terminates in a bearing in which the pintles 154 of the differential wheel 16 are supported as shown in Fig. 7.

The foregoing bearing includes an enlargement 155 in which the extension tube 156 of the counter 18 is fixedly fitted. This tube houses the counter shaft 17. The inner end of the shaft 17 is reduced at 157 (Fig. 7) to fit into a similarly shaped bore in one of the pintles of the differential wheel 16. Thus when the latter is rotated the counter will be driven in a customary manner, for the counter is a product bought in the open market.

The plate support 93 sustains the pressure disk 11 in a balanced position. The details of the former are seen in Figures 6 and 21. The inner end of the support has a hollow boss 158 in which the shaft 159 of the disk 11 is supported by ball bearings 160. The upper end of the shaft carries a plate 161 to which the disk 11 is secured. As shown in Figure 5 the shaft 20 of the disk 10 has bearings 162 both in the floor of the base and upon a bracket 163 by which one of the two end pins 55 of the drive shaft 23 is carried.

The operation is as follows: A chart 54 as taken from the meter in the field, is placed upon the chart plate 9 and secured both by means of the loose weight 56 (Fig. 18) and the pins 58. Presumably the plunger 65 is in the elevated position to which it was impelled during the prior stopping of the machine so that the detent 64 occupies one of the numerous slots 50. The chart will be so placed that the starting point falls directly beneath the pointer 52. The button 53 is pressed down until the depression 49 is free of the slot 50.

This act lowers the plunger 65. The shoulder 63 of the trigger head 61 catches and holds the detent 64 down. The pull imparted to the flexible element 75 turns the rocker 76 to the left in Figure 17 both lowering the differential wheel 16 to the surface of the disk 11 and releasing the brake pad 84 from its periphery. In this connection it must be understood that the link connection 112 with the differential carriage 90 is sufficiently loose to permit the limited turning of the carriage that ensues upon the engagement of the brake pad with the differential wheel. Lowering of the plunger 65 primarily closes the circuit 5, 6, (Fig. 11) at the contacts 7 and 8.

Turning motion is imparted to the handle 48 until the pointer 52 comes adjacent to the desired stopping time on the chart. Thus will be represented a time period for which the flow of fluid is to be calculated. The reading of the counter 18 is noted. The handles 99 and 106 are grasped, and the pens 114 and 115 moved to the beginning of the pressure and differential curves P and D respectively. The motor 3 is started by depressing the foot controller 2 where a secondary closure and completion of the circuit 5, 6 occurs.

As the chart plate 9 revolves the operator will shift the hand levers 99 and 106 as may be needed to keep the pens in accurate tracing position upon the curves. As the chart plate 9 revolves the time disk 10 will revolve in a fixed ratio by virtue of the common drive shaft 23. There is an offset between the centers of disks 10 and 11; therefore, the distance of the pressure wheel 12 from the center of the disk 10 will determine the ratio of revolutions between the disks 10 and 11.

The relationship of the roller 126 to the cam group 96 is such that only the lower part of the roller will be effective as respecting the cams. This can be understood from Figures 2 and 15 which show the progressive smallness of the cams. Only the largest cam will be effective upon the roller and the successive stages to which the roller will be elevated will find the lower part of the roller opposite to that cam which at that particular adjustment will be effective upon the pressure member 127.

The cams 96 are so set up that for any position of the pressure wheel 12 on the face of the time disk 10 the pressure pen 114 will indicate a graduation on the chart which is ten times the square of $\frac{1}{14}$th of the revolutions made by the pressure disk 11 while the chart plate 9 makes one revolution. In other words, it may be stated that the revolutions of the pressure disk 11 during the time that the chart plate 9 turns through one hour of time recorded on the chart are equal to $\frac{1}{10}$th of the numerical square root of the absolute pressure at that time being indicated by the pressure pen 114. On this principle, the number of revolutions of the pressure disk 11 for a number of indicated hours on the chart 54 become equal to the expression $$\text{Time} \times \sqrt{P}$$

As already stated, there is one cam 96 for each standard pressure range likely to be encountered. The above explanation holds true for each of the cams. The successive cams are thrown into action by adjusting the indicating handle 139 over the scale 140. As the handle is turned to the right in Figure 4, the shaft 125 is correspondingly elevated by means of the eccentric 143 until the pressure roller 126 stands opposite to the desired cam.

As the differential wheel 16 moves across the face of the pressure disk 11, its rate of rotation of course varies with its distance from the center of the disk. The cam 97 is so set up that this rate or ratio becomes some constant multiple of the square root of the differential reflected by the position of the differential pen 115. Therefore, it may be said that the revolutions of the wheel 16 are some multiple of $$\text{Time} \times \sqrt{P} \sqrt{D}$$

and therefore the revolutions as registered in the counter 18 are some known multiple of the aforementioned "extension" of the chart.

During these operations the pointer 52 approaches the stopping point. Upon engagement of the trip 60 with the head 61 of the trigger 62 (Figs. 11 and 17) the trigger will be displaced permitting the spring 78 to elevate the plunger 65 and project the detent 64 into the nearest slot 50. This instantly locks the chart plate 9 against further turning, and simultaneously opens the motor circuit at the contacts 7, 8, as well as lifts and stops the differential wheel 16 by means of the brake shoes 83 and 84.

The momentum of the motor as well as that of the disks 10 and 11 cause these parts to continue running for a time, but the slippage of the clutch in Figs. 10 and 13, permits the chart plate 9 to stand still and prevents any damage to the mechanism due to the sudden stop. The reading of the counter 18 is again taken and after deducting the original reading the difference is some known constant multiple of the "extension" of the chart.

While the construction and arrangement of the improved chart integrator is that of a generally preferred form, obviously modifications and changes may be made without departing from the spirit of the invention or the scope of the claims.

I claim:

1. A calculating machine comprising a chart plate, a time disk driven in unison therewith, a revolving pressure disk, a counter having a differential wheel driven by the pressure disk, and a pressure wheel in driving contact with both disks and movable radially of both disks in accordance with the fluctuations of an inscribed curve on a chart carried by the chart plate to variably drive the differential wheel.

2. A calculating machine comprising a chart plate, a time disk driven in unison therewith, a revoluble pressure disk, a counter operable by the pressure disk, a pressure wheel in driving contact with both disks, and means for moving the pressure wheel radially of both disks responsive to fluctuations in an inscribed curve on a chart carried by the chart plate to vary the driven ratio of the pressure disk.

3. A calculating machine comprising a chart plate, a time disk driven in unison therewith, a revoluble pressure disk, a counter having a differential wheel driven by the pressure disk, a pressure wheel in driving contact with both disks, and independent means for independently moving each wheel radially of the respective disks in accordance with fluctuations in inscribed curves on a chart carried by the chart plate.

4. A calculating machine comprising a chart plate, a revoluble pressure disk, a counter having a differential wheel driven by the pressure disk, driving means in direct rotating contact with the pressure disk, separate carrying means having styli to trace the fluctuations of curves inscribed on a chart carried by the chart plate and having articulated connections with said differential wheel and disk driving means and means to correspondingly shift said separate means for independently shifting the positions of the disk driving means and differential wheel in respect to the pressure disk to variably rotate the pressure disk and the counter.

5. A calculating machine comprising a chart plate, a driving disk, a pressure disk, driving means between said disks comprising a wheel, in direct contact with both disks, a counter having a differential wheel driven by the pressure disk, separate carriages for the driving means and differential wheel, a cam on each carriage, arms capable of movement by the cams having styli, and means to independently shift the carriages in accordance with the fluctuations in the tracing by the styli of curves inscribed on a chart carried by the chart plate to variously revolve the pressure disk and the counter.

6. A calculating machine comprising a chart plate, a pressure disk, a carriage having driving means for revolving the disk, a counter having a differential wheel driven by the disk, an arm having a stylus for tracing a curve inscribed on a chart carried by the chart plate, a plurality of cams capable of moving the arm, each cam being designed for a particular pressure range in a succession of charts, and means for shifting the carriage to vary the position of the driving means and hence the rate of revolution of the disk and the counter in accordance with one cam.

7. A calculating machine comprising a chart plate, a pressure disk, a carriage having driving means for revolving the disk, a counter having a differential wheel driven by the disk, a plurality of cams on the carriage variously designed for different pressure ranges in a succession of charts, a stylus to trace an inscribed curve on a selected chart applied to the chart plate, means to variously shift the carriage within range of the fluctuations of said curve to variously position the driving means in respect to the disk, said means being adjustable to such cam as agrees with the selected chart constituting a connection between said cam and stylus.

8. A calculating machine comprising a chart plate, a pressure disk, a pair of carriages of which one has driving means bearing on the disk and the other a counter with a differential wheel bearing on the disk, a plurality of cams on one of the carriages being variously designed for a succession of standard pressure ranges, a single cam on the other carriage, arms rendered movable by the cams of each carriage and having styli to trace curves inscribed on a selected chart applied to the chart plate, and separate means for shifting the carriages within range of the curve fluctuations thus to variously position the driving means and differential wheel in respect to the pressure disk and variously drive the counter.

9. In a calculating machine, a revoluble pressure disk, a driven pressure wheel bearing on one face of and revolving the disk, a counter having a differential wheel bearing on the other face, and a counter-balanced bracket supporting the disk and yieldingly adapting it to driving contact with said wheels.

10. In a calculating machine, a disk, a counter having a differential wheel bearing on one face of the disk, a drive wheel bearing on the other face of the disk, a weighted bracket supporting the disk between the wheels, and pivots upon which the bracket is balanced.

11. A calculating machine comprising a movable chart plate, a counter, differential drive mechanism for the counter, a plurality of cams associated with said mechanism, a stylus for tracing a curve inscribed on a chart carried by the chart plate and having an arm associated with the cams, and means for shifting the arm into the operating plane of the respective cams to produce a variable co-ordination of the differential mechanism with various charts representing different pressure ranges.

12. In a calculating machine, an arm having a stylus, a plurality of cams, a secondary member co-acting with the cams and having a slip connection with said arm, and means for moving the secondary member relatively to the arm by virtue of said slip connection to bring said member into operative relation with the various cams without interfering with an established operating position of the cams.

13. In a calculating machine, an arm having a stylus, a mounting upon which the arm can turn, a secondary member having a slip connection with said arm, a shaft to which said member is attached for corresponding turning, a plurality of cams with which the member co-acts, and means for slidably adjusting the shaft in reference to said mounting to sustain the secondary member in the various working zones of the cams.

14. In a calculating machine, a plurality of cams, an arm having a stylus, a secondary member associated with the cams, a shaft to which said member is affixed, a fixed sleeve receiving the shaft and supporting the arm in a turning position, means to slide the shaft by steps to bring said member within range of selected cams, and a slip connection between the arm and said member to compensate for the sliding of the shaft yet maintaining the operating connection between said member and the arm.

15. A calculating machine comprising a chart plate and a time disk, a motor having common drive mechanism for driving the plate and disk in unison, a counter having differential mechanism driven by the time disk, a stylus control for regulating the ratio of said mechanism to said time disk in accordance with the undulations of a curve inscribed on a chart carried by the plate, means for simultaneously stopping the chart plate and counter at an appointed position of the chart, and a slip clutch embodied in said drive mechanism to dissipate the momentum of said motor and differential mechanism.

16. A calculating machine comprising a chart plate and a pressure disk, drive mechanism for revolving the plate and disk at uniform and variable rates respectively, a counter having a differential wheel in contact with and driven by the pressure disk, a pointer associated with the chart plate to indicate a stopping point, and means associated with said pointer for simultaneously stopping the chart plate and raising the differential wheel from the pressure disk to stop its rotation.

17. A calculating machine comprising a chart plate and a pressure disk, drive means therefor, a counter having a differential wheel driven by said disk, a pointer adjustable to a selected stopping point on a chart carried by said plate, a trip associated with the pointer, a connected detent and rocker the latter having a brake shoe adjacent to the differential wheel, a spring connected with the rocker, and a trigger holding the detent away from the chart plate, being displaceable by the trip to release the detent and rocker permitting the spring to apply the detent to the plate and the brake shoe to the wheel for stopping the plate and both lifting and stopping the wheel.

18. In a calculating machine, a chart plate and a differential wheel, a plunger having a detent associated with the chart plate, a brake shoe associated with the wheel and having a rocker, a control shaft having a secondary arm connected with the rocker, and a primary arm on said shaft connected with the plunger so that a sliding movement of the plunger by virtue of turning the shaft in one direction will rock the rocker and vice versa.

19. In a calculating machine, a chart plate, an electric motor having a drive for revolving the chart plate, a detent having a plunger, a control shaft having an arm connected with the plunger being movable therewith either to depress the detent or permit the detent to engage the chart plate, an electrical circuit embracing the motor having contacts primarily engaged by the arm upon depression of the detent, and a secondary closure for completing the circuit after said depression.

20. A calculating machine for obtaining the integral of the product of the square roots of two quantities represented by curves on a chart comprising a chart plate adapted to receive a chart having the two curves thereon, a counter, a stylus adapted to follow one curve, an arm for moving said stylus, a prime mover for driving said counter, and means for varying the movements of said counter by the varying positions of said stylus including a plurality of cams, said arm having a member co-acting with a selected cam, and means for selectively associating said member for co-action with one cam.

21. A calculating machine for obtaining the integral of the square roots of two quantities represented by curves on an orifice meter chart comprising a chart plate adapted to receive an orifice meter chart having two curves thereon, a counter, a stylus arm carrying a stylus adapted to follow one curve, a prime mover, driving means between said mover and counter, and means for varying the ratio of said driving means in accordance with variations of the curve including a carriage having a plurality of cams, a follow-up mechanism to cause said stylus to reflect the movements of the carriage, and means to selectively associate said stylus with any cam on said carriage.

22. In a calculating machine for obtaining the integral of the product of the square roots of two quantities represented by curves on a chart, a driven time disk, a pressure disk substantially parallel to and spaced from said time disk, a pressure wheel in contact with both disks for driving said pressure disk from said time disk, and means to move said pressure wheel radially of said disks in accordance with variations in a curve, said means being so proportioned and arranged that the revolutions of the pressure disk are always proportional to the square root of the quantity represented by the curve.

23. In a calculating machine for obtaining the integral of the product of the square roots of two quantities represented by curves, a driven time disk, a pressure disk parallel to and spaced from said time disk, a pressure wheel in contact with both disks for driving said pressure disk from said time disk, a manually adjustable carriage for moving said pressure wheel radially of said disks, an arm having a stylus adapted to follow a curve on a chart, and means for causing said stylus to follow movements of said carriage, said means being so proportioned that the revolutions of the pressure disk are always proportional to the square root of the quantity represented by the curve.

24. The invention as defined in claim 23 wherein the said means includes a cam on said carriage, and a spring biasing said stylus arm against said cam.

25. The invention as defined in claim 23 wherein the said means includes a plurality of cams on said carriage, a spring biasing said stylus arm toward said cams, and means for selectively associating said stylus arm with any of said cams.

26. In a calculating machine for obtaining the integral of the product of the square roots of two quantities represented by curves, a chart plate adapted to receive a chart having curves thereon, a counter, a pivoted arm carrying a stylus adapted to follow one curve, a pivoted secondary member having a slip connection with said arm, a plurality of cams adapted to be selectively engaged by said member, and means to move said member axially to engage said member with one selected cam.

27. The invention as defined in claim 26 wherein the said means includes a manually operable eccentric to move said member.

28. The invention as defined in claim 26 wherein said member is secured to a shaft, said shaft being pivotally mounted, and said means includes a manually operable eccentric to move said shaft axially and thereby associate said member with a selected cam.

29. A calculating machine for obtaining the integral of the square root of the product of two quantities represented by curves comprising a rotary chart plate adapted to receive a chart having two curves thereon, a counter, two arms each carrying a stylus, each stylus adapted to follow one curve, a driven prime mover, a driving connection between said prime mover and said counter, two independent means for separately varying said driving connection to vary the speed of said counter, additional means in contact with each of said independent means for connecting the latter, each of said independent means being variable in accordance with movements of one stylus, each stylus being carried by an arm, each arm being operably connected to a manually adjustable pivoted lever.

30. A calculating machine comprising a chart plate, a pressure disk, a pair of carriages of which one has driving means bearing on the disk and the other a counter with a differential wheel bearing on the disk, a plurality of cams on one of the carriages being variously designed for a succession of standard pressure ranges, at least one cam on the other carriage, arms rendered movable by the cams of each carriage having styli to trace curves inscribed on a selected chart and applied to the chart plate, and separate means for shifting the carriages within range of the curve fluctuations thus to variously position the driving means and differential wheel in respect to the pressure disk and variously drive the counter.

31. A calculating machine for orifice meter charts comprising a rotary member adapted to receive a chart having a static pressure curve and a differential pressure curve thereon, tracing points movable over said charts and manually operable to follow the curves thereon, a friction wheel and an indicator driven thereby, a driven disk in engagement with said friction wheel, and a friction drive engaging said driven disk and rotating the same at variable speeds in accordance with one of said curves.

32. The invention as defined in claim 31 wherein said friction drive comprises a driving wheel directly engaging said driven disk.

33. A calculating machine for orifice meter charts comprising a member adapted to receive a chart having a static pressure curve and a differential pressure curve thereon, tracing points movable over said chart to follow the curves thereon, a driving member, a driven disk frictionally contacting with and driven by said driving member, means to adjust the relative positions of said disk and driving member in accordance with the movements of one tracing point, a friction wheel contacted and driven by said driven disk, and means to adjust the relative positions of said friction wheel and driven disk in accordance with the movements of the other tracing point.

34. An integrator for the charts of orifice meters comprising a platen adapted to receive a chart, driving means tending to rotate said platen and chart, stop mechanism normally maintaining said platen stationary against the action of said driving means; mechanism operable in accordance with the curves on said chart for indicating the integral of the square root of the products of two quantities represented by curves on said chart, means normally maintaining said indicating means inoperable, and means for simultaneously releasing said platen and rendering said indicating mechanism operable.

35. The invention as defined in claim 34 wherein said indicating mechanism includes a friction wheel, and said means for rendering said indicating mechanism operable causes said wheel to engage a driven member.

36. The invention as defined in claim 34 in combination with means for simultaneously stopping said platen and rendering said indicating means non-operative.

37. An integrator for the charts of orifice meters comprising a platen adapted to receive a chart, frictional driving means tending to rotate said platen and chart, stop mechanism for holding said platen stationary against the action of said frictional driving means, mechanism for obtaining the integral of the square root of the product of two quantities represented by curves on said chart and including a friction wheel, and means for simultaneously operating said stop mechanism to release said platen and for rendering said friction wheel operable.

38. The invention as defined in claim 37 in combination with means for automatically stopping said platen and rendering said friction wheel non-operative after said platen has made substantially one complete revolution.

39. A calculating machine for obtaining the integral of the square root of the product of two quantities represented by two curves comprising a platen adapted to receive a chart having two curves thereon, a driving member, a driven member, said two members being in frictional contact with the rim of one member engaging the face of the other, means for moving one of said members in accordance with the variations of one of said curves thereby to vary the speed of the driven member, and a friction wheel contacted and driven by said driven disk and having an indicating device operably associated therewith.

40. The invention as defined in claim 39 having means for varying the relative position of said friction wheel and said driven member in accordance with variations of the other of said curves.

41. A calculating apparatus comprising a rotatable platen adapted to receive a chart; means for impositively rotating said platen; a stop member for holding said platen against rotation; a plurality of peripherally engaging members for integrating the curves on the chart; and means cooperating with said stop member for disengaging one of said peripherally engaging members when said stop mechanism is operated.

42. A calculating apparatus comprising a rotatable disk; means for driving said disk; a rotatable member adapted to receive a chart; impositive driving means operated by the disk driving means for rotating said member; a plurality of peripherally engaged members including a counter; mechanism operably connected thereto and adapted to engage said disk for integrating the curves on said chart; a stop member for holding said rotatable member against rotation; and means for disengaging said counter mechanism from said disk to render the same inoperative.

43. In an integrator for meter charts, an indicator having a friction wheel associated therewith; a driven disk; means mounting said indicator and wheel for movement toward and away from said disk for driving engagement therewith; and means for bringing said friction wheel to rest against the action of its rotational inertia substantially simultaneously with the removal thereof from said disk.

44. In a calculating apparatus, an indicator having a friction wheel associated therewith; a driving disk; means mounting said indicator and wheel for movement toward and away from said disk for placing said wheel in driving engagement with said disk; means for moving said indicator and wheel away from said disk, and means for bringing said friction wheel to rest against the action of its rotational inertia substantially simultaneously with its withdrawal from said disk, said means comprising a brake member stationarily mounted with respect to said indicator and wheel and adapted to engage the periphery of said wheel when the same is moved away from said disk.

45. A calculating apparatus comprising a rotatable platen adapted to receive a chart, a driving disk, means for impositively rotating said platen, means for rotating said driving disk, a plurality of engaging members driven from said driving disk for integrating the curves on said chart, a stop member for holding said platen against rotation, and means cooperating with said stop member for disengaging one of said engaging members when said stop member is operated while said driving disk continues to operate.

46. A calculating apparatus comprising a rotatable platen adapted to receive a chart having a curve thereon, a driving disk, means for impositively rotating said platen, means for rotating said driving disk, a pivoted arm carrying a tracing point, a plurality of engaging members driven from said driving disk for integrating the curves on said chart as said tracing point follows the curve and including a counter mechanism, a stop member for holding said platen against rotation, and means cooperating with said stop member for disengaging said counter mechanism when said stop member is operated while said driving disk continues to operate.

47. A calculating apparatus comprising a rotatable member adapted to receive a chart, a driving disk, means for rotating said driving disk, interconnected integrating mechanism operable by said driving disk, means for effecting impositive rotation of said member from said first means, and stop means for holding said member against rotation and breaking said interconnection while said first means continues to rotate said driving disk.

JOHN B. McGAUGHY.

CERTIFICATE OF CORRECTION.

Patent No. 2,057,664. October 20, 1936.

JOHN B. McGAUGHY.

It is hereby certified that error appears in the printed specification of the above numbered patent requiring correction as follows: Page 8, first column, line 10, claim 39, for the word "disk" read member; and that the said Letters Patent should be read with this correction therein that the same may conform to the record of the case in the Patent Office.

Signed and sealed this 22nd day of December, A. D. 1936.

(Seal)

Henry Van Arsdale
Acting Commissioner of Patents.